US009080887B2

(12) United States Patent
Geelen et al.

(10) Patent No.: US 9,080,887 B2
(45) Date of Patent: Jul. 14, 2015

(54) NAVIGATION DEVICE AND METHOD USING MAP DATA CORRECTION FILES

(75) Inventors: Pieter Geelen, Amsterdam (NL); Erik Thomassen, Amsterdam (NL); Mareije Roosen, Amsterdam (NL); Edwin Neef, Amsterdam (NL); Sergei Kucheiko, Hilversum (NL); Rory Jones, Amsterdam (NL)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 142 days.

(21) Appl. No.: 12/735,474
(22) PCT Filed: Jan. 28, 2009
(86) PCT No.: PCT/EP2009/050948
§ 371 (c)(1),
(2), (4) Date: Sep. 7, 2010
(87) PCT Pub. No.: WO2009/112305
PCT Pub. Date: Sep. 17, 2009

(65) Prior Publication Data
US 2010/0332118 A1 Dec. 30, 2010

Related U.S. Application Data

(60) Provisional application No. 61/064,609, filed on Mar. 14, 2008.

(51) Int. Cl.
G01C 21/26 (2006.01)
G01C 21/32 (2006.01)
G01C 21/36 (2006.01)

(52) U.S. Cl.
CPC ............... *G01C 21/32* (2013.01); *G01C 21/36* (2013.01); *G01C 21/3664* (2013.01)

(58) Field of Classification Search
USPC .................. 701/450, 451, 452, 453, 119; 340/995.14, 995.18
See application file for complete search history.

(56) References Cited

U.S. PATENT DOCUMENTS 6,047,234 A * 4/2000 Cherveny et al. ............ 701/451
6,154,152 A * 11/2000 Ito ................................ 340/988
(Continued)

FOREIGN PATENT DOCUMENTS

CN 101033976 A 9/2007
DE 10030932 A1 1/2002
(Continued)

OTHER PUBLICATIONS

International Search Report.
(Continued)

*Primary Examiner* — Thomas G Black
*Assistant Examiner* — Peter D Nolan

(57) ABSTRACT

A method of operating a PND or navigation system is described, together with a PND or navigation system for performing such a method. The PND or navigation system includes memory storing map data consisting of base map data files and supplemental corrective data files. In at least one embodiment, the method includes correlating the current location with the map data, and in the event that the current location and derived map data are seemingly at odds with one another, performing at least one secondary action. In at least one embodiment, the secondary action may be the issuing of an approve/reject prompt to the user, or the automatic creation, modification or deletion of a new or pre-existing correction. In a further aspect, at least one embodiment of the invention also provides for a PND or navigation system storing an indication of a home location, and prompting a user to visit nearby locations for which corrections exist, followed by prompted or automatic confirmation or rejection thereof.

12 Claims, 10 Drawing Sheets

(56) References Cited

U.S. PATENT DOCUMENTS

| | | | |
|---|---|---|---|
| 6,253,151 B1 * | 6/2001 | Ohler et al. | 701/409 |
| 6,314,367 B1 * | 11/2001 | Ohler et al. | 701/484 |
| 6,718,258 B1 * | 4/2004 | Barton | 701/532 |
| 7,363,151 B2 * | 4/2008 | Nomura et al. | 701/445 |
| 7,496,447 B2 * | 2/2009 | Tanaka | 701/450 |
| 7,647,174 B2 * | 1/2010 | Kwon | 701/412 |
| 7,761,227 B2 | 7/2010 | Kropp | |
| 7,873,465 B2 | 1/2011 | Geelen et al. | |
| 8,112,219 B2 * | 2/2012 | Johnson et al. | 701/117 |
| 8,688,367 B2 * | 4/2014 | Mauderer | 701/409 |
| 2002/0044690 A1 | 4/2002 | Burgess | |
| 2005/0102098 A1 * | 5/2005 | Montealegre et al. | 701/209 |
| 2007/0124064 A1 * | 5/2007 | Fukui et al. | 701/208 |
| 2007/0225900 A1 | 9/2007 | Kropp | |
| 2008/0027937 A1 * | 1/2008 | Winberry et al. | 707/8 |
| 2008/0046274 A1 | 2/2008 | Geelen et al. | |
| 2008/0059055 A1 | 3/2008 | Geelen et al. | |
| 2008/0065325 A1 | 3/2008 | Geelen et al. | |
| 2008/0082225 A1 * | 4/2008 | Barrett | 701/26 |
| 2008/0177469 A1 | 7/2008 | Geelen et al. | |
| 2008/0208889 A1 * | 8/2008 | Winberry et al. | 707/102 |
| 2008/0221785 A1 * | 9/2008 | Winberry et al. | 701/200 |
| 2008/0255754 A1 * | 10/2008 | Pinto | 701/119 |
| 2009/0024273 A1 | 1/2009 | Follmer et al. | |
| 2009/0051510 A1 | 2/2009 | Follmer et al. | |
| 2010/0030459 A1 | 2/2010 | Geelen et al. | |

FOREIGN PATENT DOCUMENTS

| | | |
|---|---|---|
| EP | 1167924 | 1/2002 |
| EP | 1530025 A2 | 5/2005 |
| EP | 1832843 A1 | 9/2007 |
| EP | 1530025 B1 | 12/2008 |
| EP | 1832843 B1 | 10/2011 |
| JP | 2004021331 A | 1/2004 |
| JP | 2004184106 A | 7/2004 |
| JP | 2004-341182 | 12/2004 |
| JP | 2005284588 A | 10/2005 |
| WO | WO 2008/019884 | 2/2008 |

OTHER PUBLICATIONS

International Preliminary Report on Patentability dated Sep. 14, 2010.

* cited by examiner

NAVIGATION DEVICE AND METHOD USING MAP DATA CORRECTION FILES

This is application is National Phase entry of PCT Application number PCT/EP2009/050948 filed on Jan. 28, 2009, and claims priority under 35 U.S.C. §119 and/or 120 to U.S. Provisional Application No. 61/064,609, filed on Mar. 14, 2008, the contents of each of which are herein incorporated herein by reference in their entirety.

This invention relates to an improved navigation device and method.

BACKGROUND OF THE INVENTION

Portable navigation devices (PNDs) including GPS (Global Positioning System) signal reception and processing means are well known and are widely employed as in-car navigation systems. In essence, modern PNDs comprise:
a processor,
memory (at least one of volatile and non-volatile, and commonly both),
map data stored within said memory,
a software operating system and optionally one or more additional programs executing thereon, to control the functionality of the device and provide various features,
a GPS antenna by which satellite-broadcast signals including location data can be received and subsequently processed to determine a current location of the device,
optionally, electronic gyroscopes and accelerometers which produce signals capable of being processed to determine the current angular and linear acceleration, and in turn, and in conjunction with location information derived from the GPS signal, velocity and relative displacement of the device and thus the vehicle in which it is mounted,
input and output means, examples including a visual display (which may be touch sensitive to allow for user input), one or more physical buttons to control on/off operation or other features of the device, a speaker for audible output, -optionally one or more physical connectors by means of which power and optionally one or more data signals can be transmitted to and received from the device, and
optionally one or more wireless transmitters/receivers to allow communication over mobile telecommunications and other signal and data networks, for example Wi-Fi, Wi-Max GSM and the like.

The utility of the PND is manifested primarily in its ability to determine a route between a start or current location and a destination, which can be input by a user of the computing device, by any of a wide variety of different methods, for example by postcode, street name and number, and previously stored well known, favourite or recently visited destinations. Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice. In addition, the device may continually monitor road and traffic conditions, and offer to or choose to change the route over which the remainder of the journey is to be made due to changed conditions. Real time traffic monitoring systems, based on various technologies (e.g. mobile phone calls, fixed cameras, GPS fleet tracking) are being used to identify traffic delays and to feed the information into notification systems.

The navigation device may typically be mounted on the dashboard of a vehicle, but may also be formed as part of an on-board computer of the vehicle or car radio. The navigation device may also be (part of) a hand-held system, such as a PDA (Personal Navigation Device) a media player, a mobile phone or the like, and in these cases, the normal functionality of the hand-held system is extended by means of the installation of software on the device to perform both route calculation and navigation along a calculated route. In any event, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function provided, and the navigation along such a route is another primary function. During navigation along a calculated route, the PND provides visual and/or audible instructions to guide the user along a chosen route to the end of that route, that is the desired destination. It is usual for PNDs to display map information on-screen during the navigation, such information regularly being updated on-screen so that the map information displayed is representative of the current location of the device, and thus of the user or user's vehicle if the device is being used for in-car navigation. An icon displayed on-screen typically denotes the current device location, and is centred with the map information of current and surrounding roads and other map features being also displayed. Additionally, navigation information may be displayed, optionally in a status bar above, below or to one side of the displayed map information, examples of navigation information including the distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that
a user deviates from the previously calculated route during navigation therealong,
real-time traffic conditions dictate that an alternative route would be more expedient and the device is suitably enabled to recognize such conditions automatically, or
if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Current map data providing companies such as TeleAtlas NV and NavTeq® produce digital map data in the form of one or more base data files from which the PND extracts information which is used in the creation of graphical representations of geographical features, such as roads, buildings, railroads, and other landmarks and POIs. This information is displayed on the screen of the device, and is refreshed almost continuously, to provide the user with a continuously changing map of the current location and surrounding area with reference to a generally stationery graphical vehicle indicator also displayed in the middle of the screen. The extent of the detail shown in the map is dependent on many factors including the particular scale of the map chosen by the user, the speed of travel, and of course the level of detail provided by the underlying map data files in use for the particular locality in which the device is currently situated. For example, only relatively little information may be displayed on the screen of the device when the user is traveling on a motorway through countryside, whereas relatively much greater levels of detail may be provided on-screen when the user is traveling through a city on congested roads, and thus quite slowly.

In this latter scenario, the navigation functionality provided by the device is enhanced by the display of more detailed information on-screen on account of the greater likelihood that the user can correlate road-side or road-based features displayed on-screen with the corresponding physical features which he can see as he drives along the particular road or roads in question. One disadvantage with current map provider-originated data files is that their level of detail only increases with every successive version release. As such, these occur only relatively infrequently, and therefore it is possible for map information to be outdated by changes in road layouts and the implementation of access limitations often occurring in cities and to a lesser extent, in extra-urban regions. Additionally, map data does not generally include transient road alterations, such as may be caused by road works; carriageway reductions or alterations, or pedestrianization of roads previously mapped as vehicular thoroughfares.

Indeed, as a result of the various processes used in the creation of digital map data, it is often the case that map data files installed in new PNDs and navigation systems already tend to be at least a year or so out of date by the time the device or system is delivered to the end user. Accordingly, the present applicant has developed MapShare™ technology in software provided on the device which affords the user the facility to identify a variety of corrections for immediate or subsequent transmission to validation, collation and/or other back-end, server-based processing at a centralized location. Transmissions of such map-specific, corrective information may be delivered by means of establishing a short-range wireless communication with a mobile telephone, usually using a Bluetooth® protocol thus enabling the device to transmit such information ultimately over a mobile telecommunications network.

Examples of the corrective information which may be stored and subsequently transmitted from the device (all of which information being geospatially tagged with specific location coordinates or a range of coordinates where a road or road segment is identified and desired to be corrected) are: Street unblocking/blocking (i.e. making a previously un-enterable street enterable and vice versa), one-way direction reversal, street name data and property number/name data, addition or removal of POIs and POI data, the identification in map data of a new street/road or the removal of a map-data identified street which no longer exists, missing, incorrect or alternative city name data, new/redundant motorway entrance/exit data, missing/incorrect postcode information, roundabout addition/deletion, and other correction data for which simple, user-enterable description may be provided and does not fit into any other categories.

Additionally, it is possible to download corrections previously validated, to a greater or lesser extent depending on various categorization or user trust level types, from a centralized map data updates location. Such corrections may be downloaded either by means of connection of the device using a physical to a USB cable to an internet connected PC executing appropriate software which communicates both with the centralized server by means over the Internet and with the device over the cable, or wirelessly with a local mobile telephone.

Currently however, correction data which is downloaded is immediately stored on the device and applied to the underlying map data without any requirement for user interaction, such correction data being automatically assumed by the device to represent correct information.

It is an object of the present invention to provide a PND or navigation system, a method of operating such, and a computer program by means of which such are controlled which allows a PND or navigation system to provide enhanced map data correction.

BRIEF SUMMARY OF THE INVENTION

According to the present invention, there is provided a method of operating a PND or navigation system having one or more base map data files to which have been applied one or more map data correction files containing both geospatial information and error identification information, which together form a basis for navigation, route guidance, and map information display on a display screen of the PND or system, characterized in that the method includes the steps of determining a current or home location of the device or system and the distance of such from one or more of the locations geospatially identified in the map data correction files, and effecting some alteration or qualification of the error identification either on or after receiving a user response to a prompt output by the device or system when said distance is less than a predetermined threshold or the current or home location is coincident with or proximate to one or more of the geospatially identified locations, said prompt at least partially being representative of the error identification, or automatically when said distance is less than a predetermined threshold or the current or home location is coincident with one or more of the geospatially identified locations, and the location of the device as compared to the location of the error identification is such that the existence or absence of the error can be automatically determined by the device without user input.

Preferably, the prompt is a request of the user to confirm the veracity of the error identified at that geospatial location. Alternatively, the prompt may be in an approve/reject form, but in any event, the prompt allows a user a simple and quick means of creating qualifying information relating to a respective error identified in the map data correction files at that time local to the device or system.

Preferably, the qualifying information is stored on the device for subsequent transmission by known means to a centralized map correction data processing, validation, collation, or other back-end facility.

Most preferably, the map data correction file or files additionally contain qualifying information relating to each of the errors identified therein, such qualifying information being in the form of a trust or other error categorization level, the method including the step of increasing or reducing the value of the qualifying information when a user approves or rejects a respective error, or automatically in the event that the device travels in a manner, determinable by the device, which is automatically indicative that an error identified in the map data correction files is correct or incorrect.

In a preferred aspect of the invention, the method includes the step of effecting an automatic deletion of the error identification and the corresponding geospatial location data in the event that either the user confirms that the error identification is incorrect after being prompted to do so, or automatically in the event that the device determines that the error identification is incorrect automatically.

In an alternative aspect of the invention, there is provided a method of operating a PND or navigation system having memory storing map data consisting of one or more base map data files, optionally having one or more supplemental corrective and/or ancillary data files applied or applicable thereto, a display GPS signal reception and processing means by means of which a current location is determinable, such together forming a basis for navigation, route guidance, and map information display on said display, optionally a sensor or an association therewith from which one or more motion-specific parameters can be measured, calculated or otherwise determined by said device or system, and optionally a locally stored vehicle-specific parameter indicative of a characteristic of the vehicle in which the device or system is commonly situated, characterized in that the method includes the steps of correlating the current location with said map data to derive one or more map-specific parameters for that location and comparing said one or more map-specific parameters with one or more of a motion-specific parameter, a vehicle-specific parameter, the current location, to determine whether the current location, motion or vehicle-related characteristic is permissible or appropriate therefor, and in the event that the current location, motion, or vehicle-related characteristic and derived map-specific parameter are seemingly at odds with one another, performing at least one secondary action.

Preferably, the secondary action is selected from the following:

issuing a prompt to the user to confirm whether the current location, motion or vehicle-related characteristic is appropriate or possible or whether the result of the comparison can be ignored, issuing a warning to the user indicating the impossibility or inappropriateness of said current location, motion, or vehicle related characteristic as regards the map-specific parameter, automatically creating a new, or altering, qualifying, correcting or deleting a previously existing, map data correction including at least some location information and some correction identifying information logging specific device location and map data correction information for later verification, flagging, adding meta-data to, or otherwise identifying at least one recorded entry in GPS trace log data, such data being commonly stored in the device during operation every few seconds or other suitable period, any combination of the above.

The usefulness of adding an identifying (bit-wise) flag and/or meta-data to GPS trace log data has the advantage for post-processing of this data, particularly when such data is processed to determine where there might be issues or inconsistencies with map data. For instance, GPS trace log data from devices (usually submitted by means of downloads from devices to a connected PC and thence over the internet to a back end processing facility of device/map data manufacturers) will typically contain only GPS data and a time stamp, or differential values for these characteristics from initial GPS and time readings. As can be imagined, vast amounts of GPS trace log data may be recorded, and require lengthy and resource-hungry analysis using known map-matching techniques to determine map errors. This process can be dramatically accelerated by only processing GPS trace log data which has been flagged in the device during recordation thereof (again using map-matching techniques). This being the case, the post-processing is restricted to only flagged data, map errors can be confirmed, verified or rejected in a much quicker time frame. Such flagging might also usefully occur when any unexpected automatic route-re-planning is conducted by the device.

Preferably, the location information provided in a new map data correction is determined at the time of, subsequent to, or within a threshold time of, the comparison, and further preferably the correction identifying information provided in said new map data correction includes, is indicative of, is derived from, or forms the basis for, the map-specific parameter with which the current location, motion or vehicle-specific parameter was seemingly at odds.

Preferably, the motion-specific parameter is one or more of a current travel direction, current speed, current linear and/or angular acceleration, such being determinable by the device or system either from received GPS-signals, and/or one or more sensors provided as part of the device or system, for example a gyroscope, an accelerometer, a system clock, or with which said device or system can communicate. In a preferred embodiment, the device or system may obtain information from a variety of sensors commonly provided within vehicles, such as a speed sensor, brake sensor, direction or heading sensor, fuel gauge, and the like.

Accordingly, in this aspect, the invention provides a means of automatically creating, modifying or deleting correction data in the event that the device itself determines that its own movement or location is not possible or appropriate when such movement or location is "virtualised" in the map data stored on the device. Additionally, in the event that one or more vehicle-specific parameters is derived from associated sensors, or is entered by the user locally in the device or system, for example on start-up, and stored in the device or system memory, the device can subsequently determine from map data and the current location that the particular vehicle related characteristic represented by the vehicle-specific parameter, for example the vehicle type, width, weight, length, height, is appropriate or possible for the particular road at that time being traveled. For instance, if:

the map data and any correction applied thereto indicates that a road is of a particular width, the locally stored vehicle-specific parameter indicates that the current vehicle is of a greater or dangerously similar width to that of the road as it is represented in map data, and the device determines that it travels along that road, then a deduction can automatically be made by the device or system that the map data is in error, as the road is passable to vehicles having a width indicated by the vehicle-specific parameter. Accordingly, a correction may be created automatically by the device or system, possibly upon user approval of an approve/reject prompt issued by the device or system, such correction including some indication of the road traveled, and a revised permissible width.

In a further example, in the event that the device travels along a one-way street in a particular direction, both the direction of travel and current location of the device may be calculated by the device and correlated to the map data, from which the device can also determine that the access direction for that street is opposite to that in which the device is currently traveling. In this circumstance, the device may either issue an immediate warning to the user, prompt the user to correct the map data by confirming that the access direction for the current street is incorrectly identified in the map data, or additionally or alternately, the device may automatically create correction data including location information specifying the street and other data identifying the fact that the map data specifies an incorrect access direction. It also possible for the device to determine that the current speed of travel along a particular road or stretch of road is greater than the speed restriction identified in map data for that road or stretch of road, and take appropriate automatic or prompt/response dependent corrective action.

Thus, the map-specific parameter may be one of a thoroughfare access restriction, optionally based on a time of day or other criterion, a speed restriction, a turn restriction, a calculated suitable turn rate through a corner, or a height/weight/width restriction.

The subsequent correction automatically created, modified or deleted may relate to the opening up of a previously non-existent or temporarily closed thoroughfare, the closure, removal, demolition or abolition of a previously available thoroughfare and the like, an alteration of one type of road junction to another (e.g. a road crossing being altered to a roundabout, or vice versa), the absence, omission or temporary closure of a building, POI or the like, or the addition of a new building, POI, or other premises, optionally forming part of a desired destination or waypoint.

In a preferred arrangement, correction data is qualified by a trust level indicative of the nature of the correction, such trust level being ascribed on one or more of the following bases:

data originating from a base map data provider, data having been verified by a device provider data originating from a POI to which a subscription has been established data from a limited number of "trusted" sources data having been reported by many people, or data only having been reported by relatively few people, and data originated by the current user.

In a yet further preferred embodiment, the correction is further qualified by a particular validity duration or other measure of time.

In further aspects of the invention, a computer program, embodied on computer readable media as required, is provided for implementing the methods described above, as is a PND and/or navigation system adapted to perform the methods described.

BRIEF DESCRIPTION OF THE DRAWINGS

The present application will be described in more detail below by using example embodiments, which will be explained with the aid of the drawings, in which.

DETAILED DESCRIPTION

Figure 1:
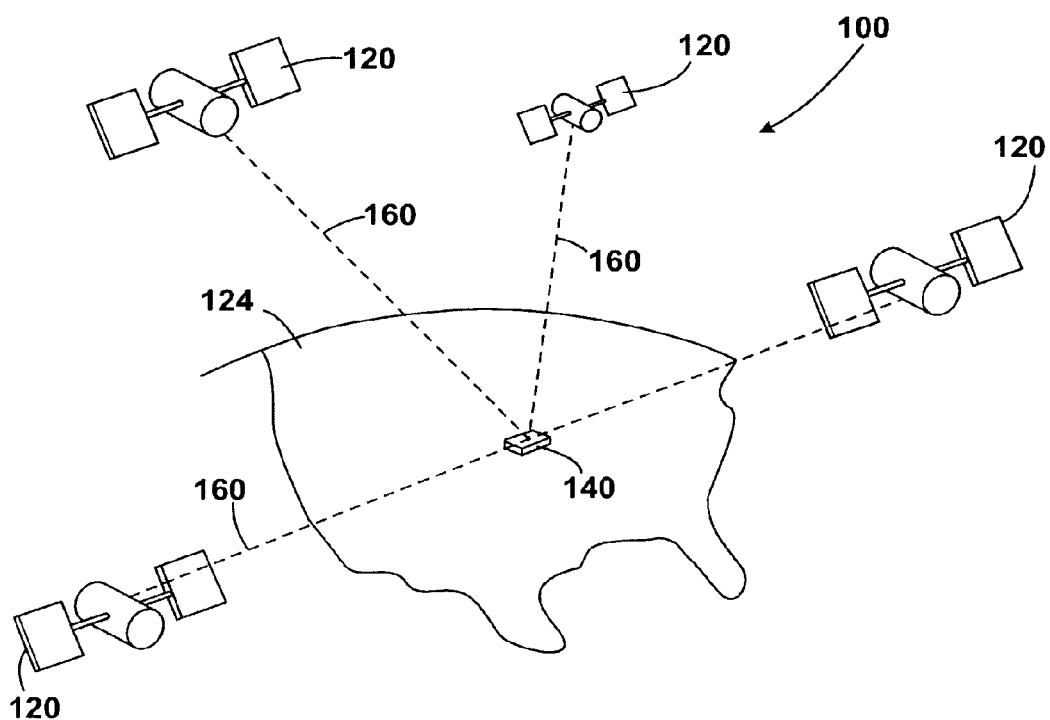
FIG. 1 illustrates an example view of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

Figure 2:
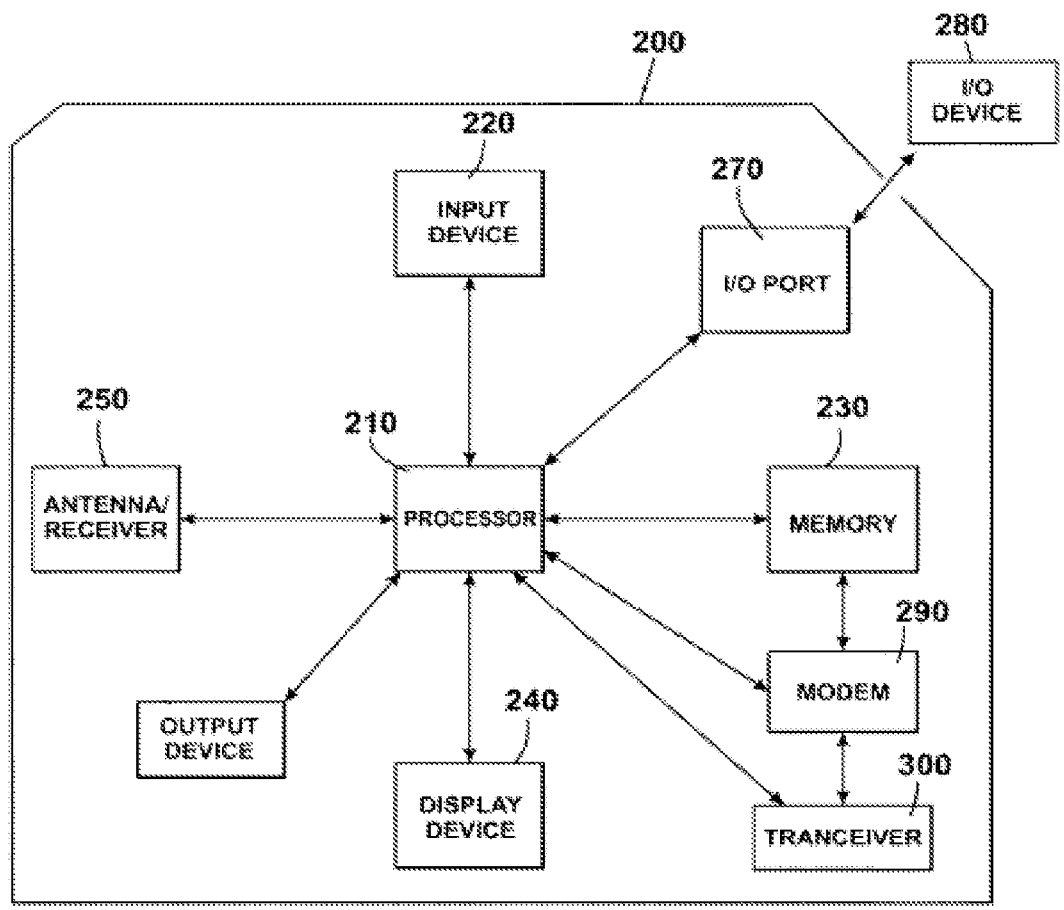
FIG. 2 illustrates an example block diagram of electronic components of a navigation device.

The spread spectrum signals 160, continuously transmitted from each satellite 120, utilise a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner. FIG. 2 illustrates an example block diagram of electronic components of a navigation device 200, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. The input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices can also include, including but not limited to, an audible output device. As output device can produce audible information to a user of the navigation device 200, it is equally understood that input device 220 can also include a microphone and software for receiving input voice commands as well.

In the navigation device 200, processor 210 is operatively connected to and set to receive input information from input device 220 via a connection, and operatively connected to at least one of display screen 240 and output device, via output connections, to output information thereto. Further, the processor 210 is operatively connected to memory 230 via connection and is further adapted to receive/send information from/to input/output (I/O) ports 270 via connection, wherein the I/O port 270 is connectible to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200 may establish a "mobile" or telecommunications network connection with the server 302 via a mobile device (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using the internet for example, can be done in a known manner. This can include use of TCP/IP layered protocol for example. The mobile device can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated.

FIG. 2 further illustrates an operative connection between the processor 210 and an antenna/receiver 250 via connection, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
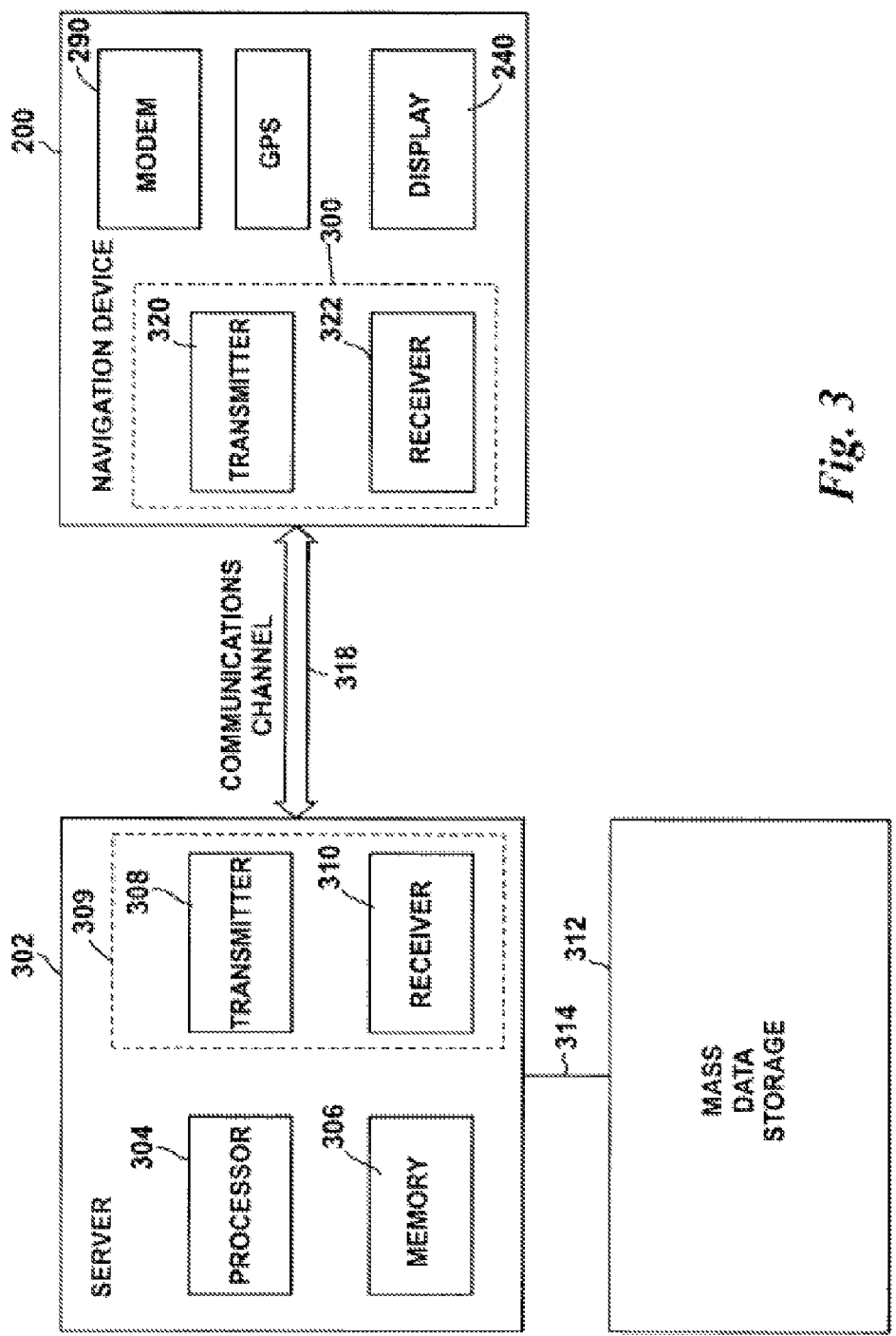
FIG. 3 illustrates an example block diagram of the manner in which a navigation device may receive information over a wireless communication channel.

FIG. 3 illustrates an example block diagram of a server 302 and a navigation device 200 capable of communicating via a generic communications channel 318. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver 309.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor 210, memory 230, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver 300.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel 318 and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, the communication channel 318 can include intermediate devices such as routers, repeaters, buffers, transmitters, and receivers, for example.

For example, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device, such as audio input/output devices for example.

Figure 4A:
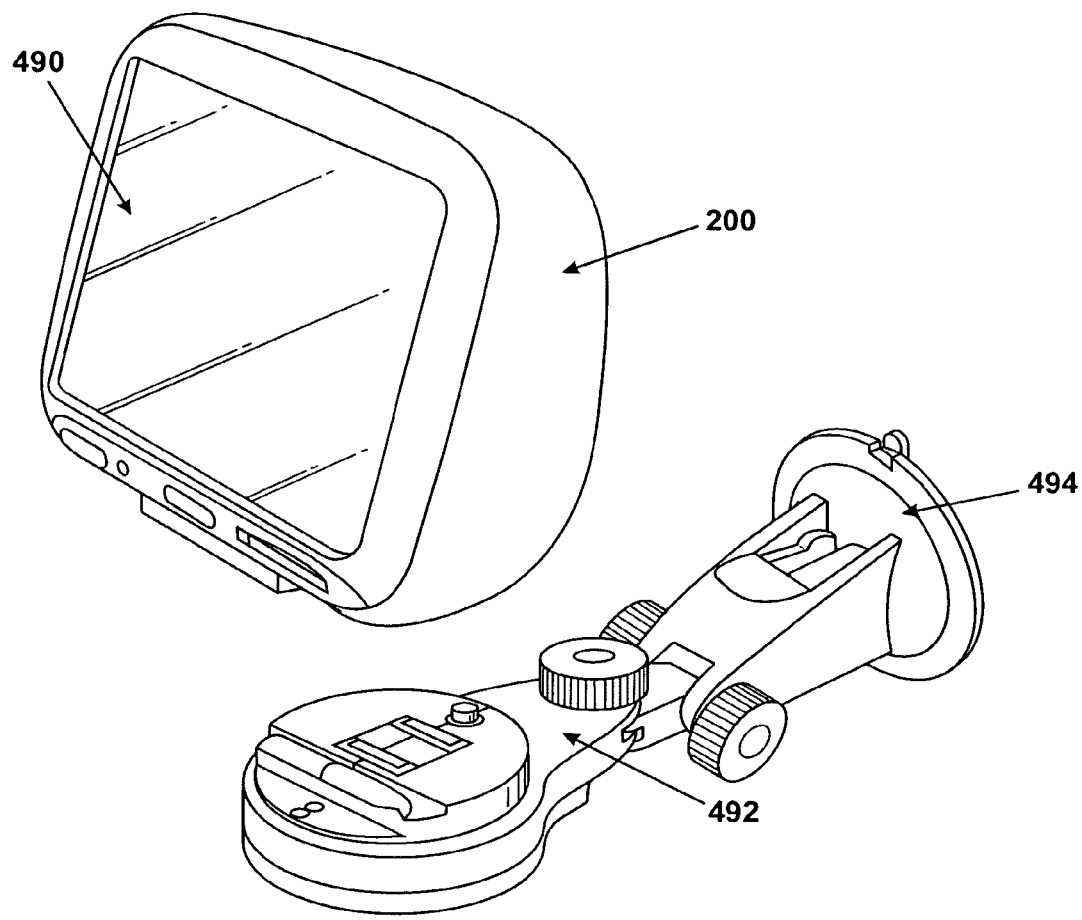
FIGS. 4A and 4B are perspective views of an implementation of an embodiment of the navigation device.
Figure 4B:
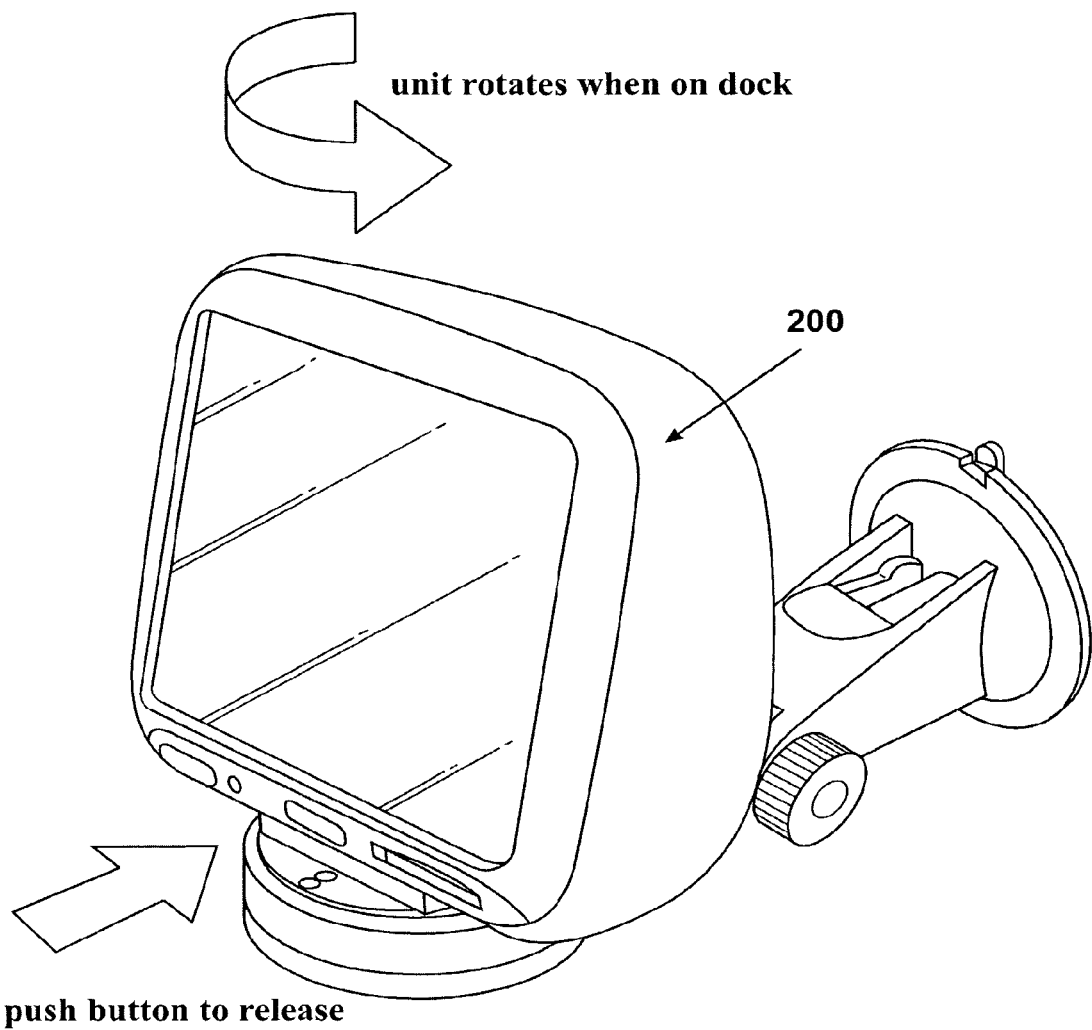

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked. As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

Figure 5A:
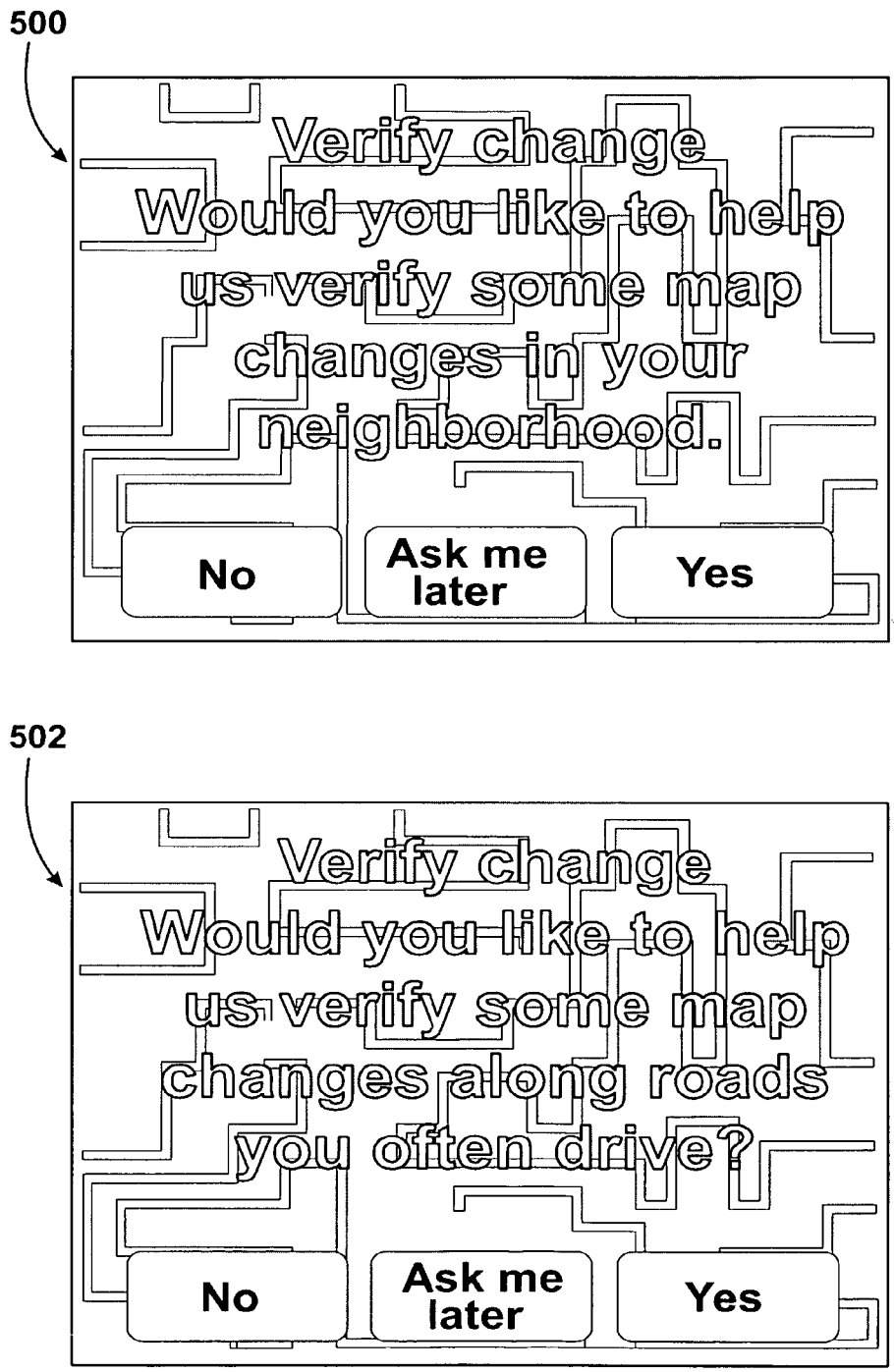
FIG. 5A shows screen shots illustrating two of many possible options which may be selectable on a device or system to effect operation thereof in accordance with the present invention.

Referring now to FIG. 5A, the software of the device may typically be provided with a plurality of user-settable preferences. Examples include the setting of display colors, voice and spoken instruction preferences, information display preferences such as the manner in which street names and other useful navigation instructions may be displayed, and device start-up preferences. The setting of such options is commonly achieved, after a user touches the screen of the device, by displaying a menu, optionally scrollable, of various user-selectable icons and/or text, subsequent selection of which results in the display of either one or more further menus of selectable icons or text, or a particular option-setting screen, two examples of which are shown at 500 and 502 in FIG. 5A. As can be seen from the figure, these two screen-shots relate to the setting of slightly different options within the machine. The screen shot 500 enables the device to prompt the user for verification of device-determined map data errors in their neighbourhood, such being defined with reference to a previously user-set "home location" stored in the device memory, for example within a pre-determined threshold distance of that home location. The screen shot 502 enables the device to prompt the user for verification of device-determined map data errors along roads which the user often drives, such possibly being determined with reference to a log file of the device movements over a predetermined time period. In further embodiments, options may exist to permit the device to automatically, that is without issuing any prompt or verification, make map data corrections, or to amend such corrections as may already exist and being applied to the base map data files stored in the device memory.

Figure 5B:
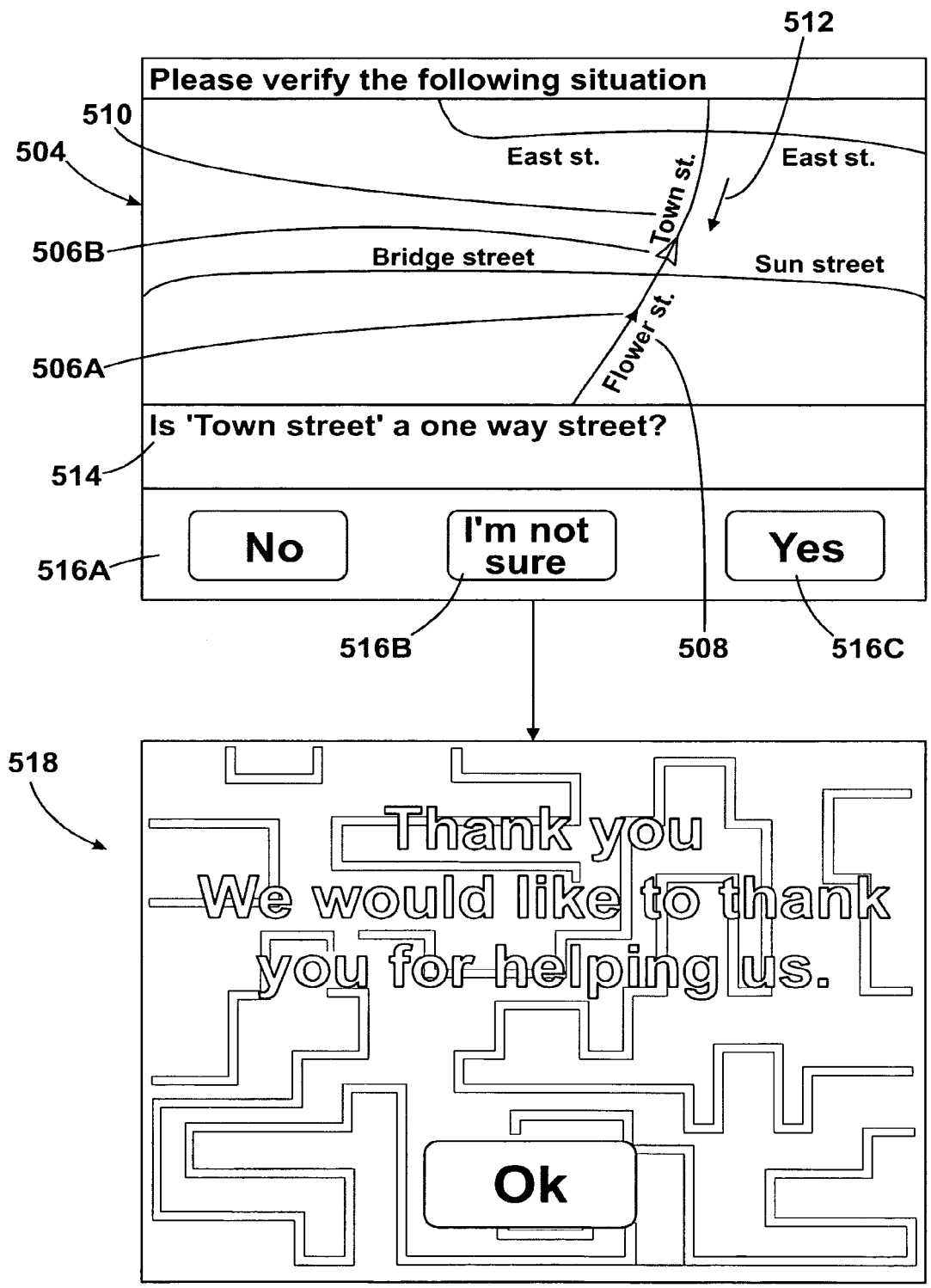
FIG. 5B shows screen shots illustrating how the device or system might prompt a user to verify a device- or system-identified correction, FIGS. 6-11 provide further screen shots illustrating examples of the types of prompt which might be issued by a device or system capable of determining map errors in accordance with the invention.
Figure 6:
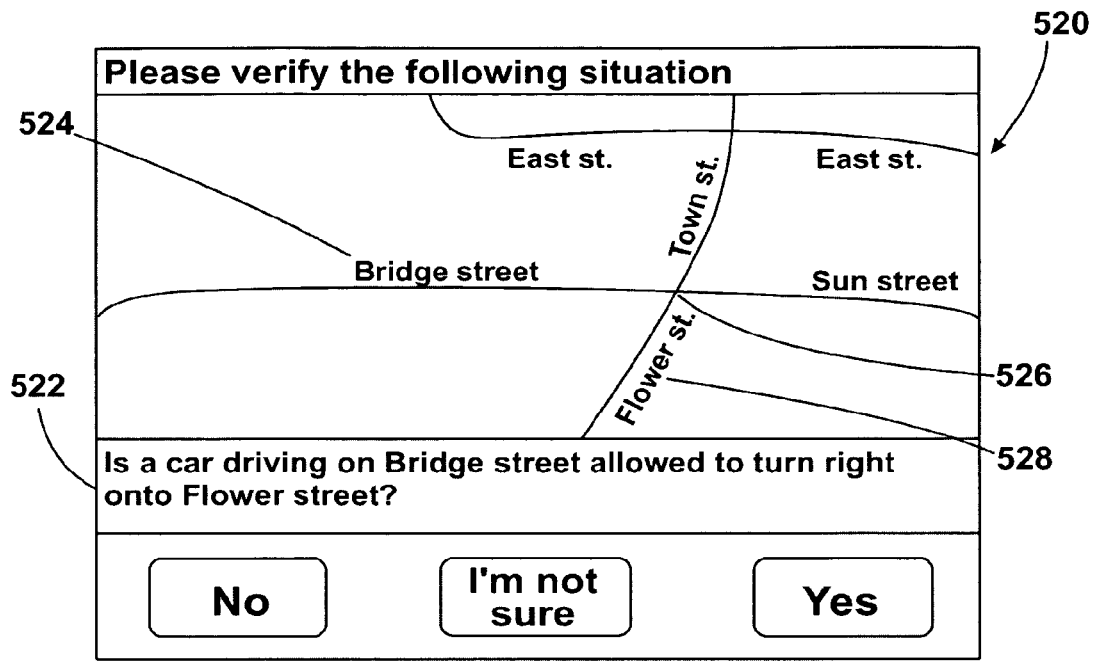

In FIG. 5B, the screen shot 504 schematically indicates how the device might issue a prompt for verification to the user, such possibly also optionally being accompanied by an audible output, such as a beep or spoken warning. A number of factors may be involved in the display of a verification prompt such as that illustrated at 504 being "Is 'Town Street' a one way street?", and these are explained below. Furthermore, it is to be mentioned that although the following description relates substantially to real-time prompting of the user as he moves with the device, it is equally possible for the device to log potential correction information together with standard log data, and for the verification of correction data to occur much later in time than the actual determination by the device that potential corrections may be required. For instance, in the case where the persistent logging of device location data occurs, the log data may be transmitted back to a central processing facility with similar data from other device users for collation, analysis and filtering, and for specific correction data to be returned to the user for subsequent verification at a time other than when driving or otherwise traveling with the device. In this instance, the returned data might take the form of a quiz consisting of a number of different verification requests for corrections either within a predetermined distance of a user's home location, or along roads along which the device user often travels.

In a real-time prompting mode however, as the device displays map information during a free-driving or navigation mode, the current position of the device is generally known or approximated, as are a number of other parameters concerning the current motion of the device, such as angular and linear speed and acceleration and general direction of travel, such being motion-specific parameters, together (possibly) with a number of pre-set parameters specifying the type of vehicle or mode of transport with which the device is currently associated, such being vehicle-specific parameters. Examples of this latter type of parameter include the vehicle type, size, weight, typical occupancy levels and the like.

Accordingly, as these various parameters are known to the device, it is possible for the device to not only to graphically represent relevant map information on its screen (as forms part of the normal operation of the device in its free-driving and navigation modes), but also for the device to determine from the underlying map information (and corrections applicable thereto) certain other parameters specific to the particular road or intersection at that time being traversed by the device. Examples of these so-called map-specific parameters might include actual or calculated restrictions on the manner of travel along a road or through an intersection, or the mode of travel permissible, specifically one-way street travel directions, road speed restrictions, intersection turn restrictions, the severity of bends along a road or through an intersection, weight, width or height restrictions, and time restrictions on particular modes of travel along roads or through intersections as well as time restrictions on when such may be open or closed.

Thereafter, a comparison of the vehicle- and/or motion-specific parameters, and/or indeed the current device location, may be made one or more device-determined map-specific parameters, whereupon the device can determine whether any of the former parameters or its current location is in conflict with the relevant map-specific parameter, and if so, the device may take appropriate secondary action, such logging, creating, or modifying specific correction data, or issuing appropriate prompts or warnings to the user before, during or after such logging, creation, or modification has occurred.

Although this description relates to the embodiment of the invention wherein the vehicle- and motion-specific parameters are primarily calculated by a stand-alone navigation device, it should be specifically mentioned that such a device may receive vehicle- and motion-specific data from one or more sensors commonly or specifically provided within the vehicle in which the device is situated, or in the fabric of which the navigation system is installed at build time. Notwithstanding such different embodiments, it is envisaged that the signals received by the device or system are merely electronic or electric indications of such vehicle- or motion specific parameters, and the receipt of such by the device or system merely reduces device/system processor overhead in terms of specific calculations required to obtain such parameters from data available to, or at any time extant within said device or system.

In the embodiment shown in FIG. 5B, map information is being displayed and the device has determined that the current location, indicated at 506A is along "Flower St", the name of which is indicated at 508. The device also determines that its direction of travel is towards an intersection from which one of the radiating streets is "Town St" 510 which is indicated as being a one-way street by means of a suitable directional identifier 512. Accordingly, if the device approaches and then travels through the intersection, and subsequently along "Town St" in a direction opposite to the direction of permissible vehicular travel indicated in map data, its location being now 506B, then while the location of the device is still permissible for "Town St.", its direction of travel is at odds with the map data. Therefore, in accordance with any pre-set option for prompting, the device may take any of a number of different secondary actions.

One of such secondary actions is to cause prompt text 514 "Is 'Town St.' a one-way street?", and accompanying selectable option buttons 516A, 516B, 516C, to be displayed to allow the user to quickly verify whether the underlying map data within the device is at fault, whether the user is at fault, or to enter some indeterminate state information as to the veracity of the map data. As will be appreciated, user verification of the veracity of the proposed correction while driving may not be appropriate, and therefore, in one embodiment, the device or system may delay the verification of this and other corrections until the user reaches a destination, or the device determines that it is been stationary for a predetermined time, or by any other suitable time delay. However, regardless of when the verification occurs, the device will have stored some indication that an apparent conflict occurred between a map-specific parameter, in this case the permissible direction of travel along "Town St.", and a device-determined motion-specific parameter, in this case the fact that, at a certain time or times, the direction of travel along "Town St." was opposed to that indicated as permissible in map data. Such indication may be considered in essence a correction, and whether such is temporary or permanent may depend on the subsequent verification or rejection performed by the user.

Screen shot 518 provides a simple (optional) "thank you" to the user for verifying any map correction data which may be or may have been automatically created or modified, as a result of the user's response to the prompt. The format of the correction or modification may be of any suitable type, but most preferably would include an indication of the relevant location of the device, such as its specific location or the relevant road or intersection, or a range of such locations, and the nature of the determined map-data error resulting from the apparent conflict between any of:

the current location,
  one or more vehicle-specific parameters,
  one or more motion-specific parameters, and said one or more map-specific parameters. Possible additional information may include some indication of time, for example being that time at which the comparison between the above parameters was made, or that at which the user verified the map data error, or any other suitable or relevant time as might be appropriate. Further optional data stored as part of the correction may include some category information specific to the device or user thereof in terms of a trust level applicable to the stored correction.

All the data embodied in a correction may be stored in the same manner in the device memory as other previously stored corrections, and furthermore may be utilized in the same manner as such corrections, inasmuch as such corrections may be utilized in route calculation, guidance and navigation functions of the device.

Other examples of the types of verification required by the user may be seen in the screen-shots illustrated in FIGS. 6-12. Although these screen shots are typical of verification prompts which may be displayed after the device user has completed his journey, it is equally possible that such prompts may be displayed en-route or while driving. For example in screen shot 520, prompt text 522 requests of the user whether it is possible, when traveling along "Bridge Street" indicated at 524, it is possible to turn right at intersection 526 into "Flower St". Such a "turn restriction" may be in force regardless of whether "Flower Street" is one- or two-way, and therefore would typically be identified separately from a travel direction restriction for that road. This type of prompt would generally appear at some time after a user has made such a manouevre, such thus being in contravention of the turn restriction at that time extant within the map data of the device.

Figure 7:
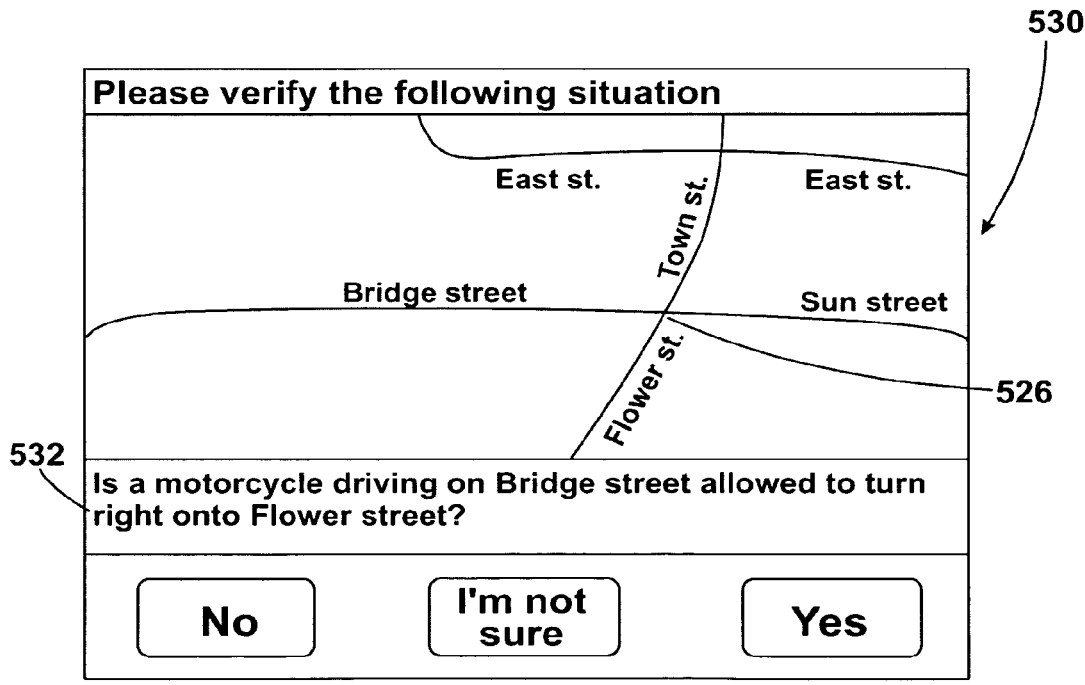

In screen shot 530 FIG. 7, it is to be noted that the prompt text 532 is specific to both a type of vehicle, and a type of manouevre, and therefore demonstrates that different types of parameter may be compared by the device simultaneously or consecutively as the device travels in a navigation or free-driving mode. In this case, the map-specific parameters derived by the device from map information would include both any turn restriction in force at the intersection 526, and also any vehicle restriction prevailing on "Flower Street". Of course, for the invention to be applicable to the vehicle-specific parameter, the user would need to set an option indicating that the device was being used for motorcycle navigation, or the device would require a pre-set option indicating such vehicle type.

Figure 8:
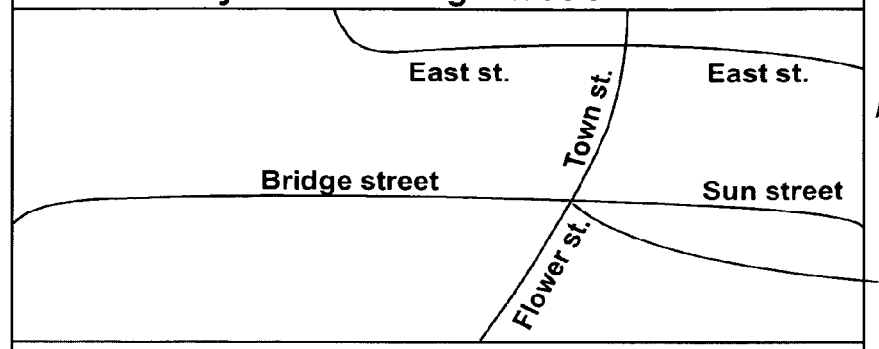

In FIG. 8, screen shot 534 provides a verification prompt relating to the possible existence of road works on "Town Street", as indicated at prompt text 536. This Figure illustrates a yet further embodiment of the invention wherein— the device is operating in a navigation mode,
  the route being navigated includes "Town Street", and
  the user deviates from the planned route so as to avoid traveling along
  "Town
  Street".

In this embodiment, the device makes a comparison between a current location and a preprogrammed route, and determines that the route was not followed at a particular intersection. Of course, this event may be automatically recorded as described above, but the prompt which is subsequently displayed may relate to any of a number of possible causes for the user not following the calculated route. Various examples might include, of course, the existence of road works, turn restrictions, vehicle and/or other access restrictions, such as for example being based on time of day, and the like. Accordingly, although the prompt text 536 relates only to one possible restriction on "Town Street", such may require replacement by a number of different selectable options relating to the various possible events or causes for the user not following a route which included this street.

Figure 9:
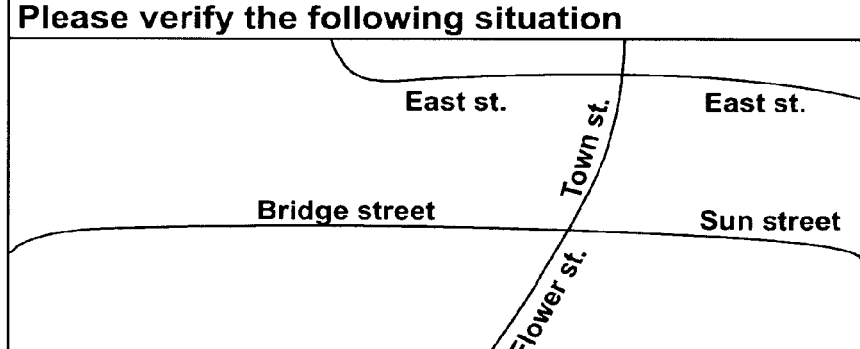

Furthermore, an alternative embodiment of the invention and relating to a device operating in a navigation mode, is shown in FIG. 9. The screen shot 538 includes prompt text 540 requesting the user to confirm whether previously identified road works along town street no longer prevail. Such a prompt might be issued in response to the device previously identifying that the user had travelled along town street in either a free driving or navigation mode, thus raising a conflict between map-specific data (i.e. the road works preventing travel therealong either in one direction or completely), and the device location and/or direction of travel (i.e. Town Street).

Figure 10:
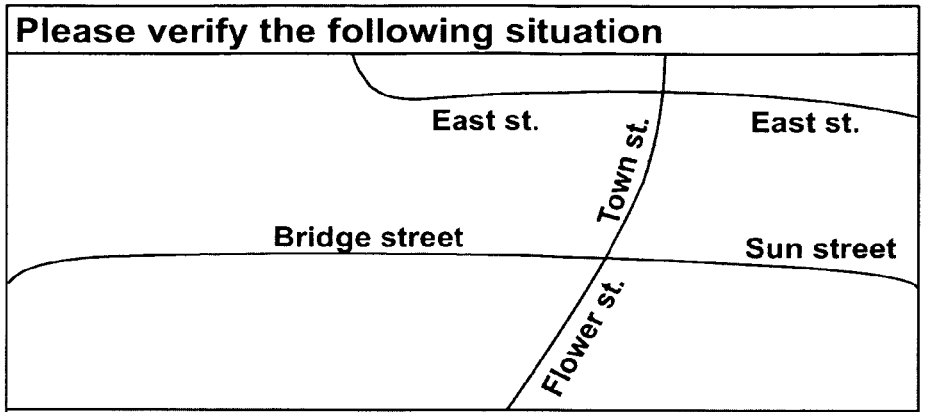
Figure 11:
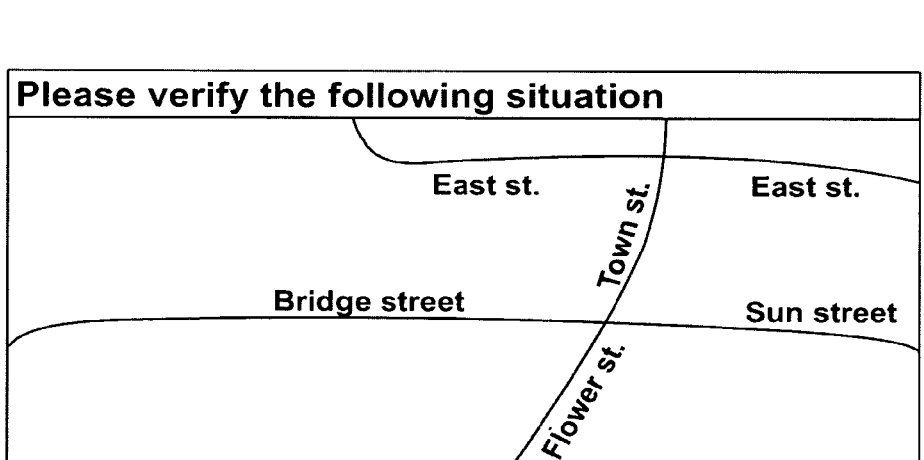

Finally, FIGS. 10 & 11 provide screen shots 542, 544 respectively of further user verification prompts relating to vehicle access restrictions in terms of time and type, such prompts again being issued subsequent to a vehicle of a particular type traveling along the relevant street at a time when map data indicates such travel is impermissible.

The invention claimed is:

1. A method of operating a navigation system of a vehicle including one or more base map data files to which have been applied one or more map data correction files containing both geospatial information and error identification information, which together form a basis for navigation, route guidance, and map information display on a display screen of the navigation system, the method comprising:
   determining a current or home location of the navigation system and a distance of the current or home location from one or more locations geospatially identified in the map data correction files, and
   effecting at least one of alteration and qualification of the error identification upon or after receiving an affirmative user response to a prompt automatically output by the navigation system when the distance is less than a threshold and based on a vehicle-specific parameter, the prompt at least partially being representative of the error identification, wherein the vehicle-specific parameter is at least one of: vehicle type; vehicle size; and vehicle weight.

2. A method according to claim 1, wherein the prompt is a request of the user to confirm a veracity of the error identified at a specific geospatial location.

3. A method according to claim 1, wherein the prompt includes at least one of an approve and a reject option.

4. A method according to claim 1, wherein the alteration of the error identification is its deletion.

5. A method according to claim 1, wherein the prompt includes or causes display of a user data entry screen whereby the user is permitted to enter specific data relevant to the correction desired to be created, modified or deleted.

6. A method according to claim 1, wherein the error identification information includes qualifying information, the qualifying information being in the form of a trust level, the at least one of alteration and qualification including increasing or reducing a value of the qualifying information when a user approves or rejects a respective error.

7. A method according to claim 1, wherein the qualification of the error identification includes providing an indication of a relative trust level of the error identification.

8. A method according to claim 1, wherein the error identification, subsequent to at least one of alteration and qualification, is stored on the navigation system for subsequent transmission to a centralized map correction data processing facility.

9. A method according to claim 1, wherein the navigation system is a personal navigation device (PND).

10. A non-transitory computer readable medium comprising computer program code segments, adapted to perform the method of claim 1 when run on a computer device of the navigation system.

11. A navigation system for use in a vehicle, comprising:
    memory, in which one or more base map data files to which have been applied one or more map data corrections containing both geospatial information and error identification information, are stored;
    a display; and
    a processor, configured for processing received navigation satellite signals to determine a current geospatial location of the navigation system, correlating the processed information with the map data and causing display of information representative of the map data at and in the vicinity of the current geospatial location of the navigation system, said processor also being configured for performing navigation and route guidance in an event that a desired destination is selected, wherein the memory additionally stores a current or home location, wherein said processor is configured for determining a distance of the current or home location from one or more of the locations geospatially identified in the map data correction files, the processor further being configured for causing the navigation system to automatically output a prompt soliciting a user response when the determined distance is less than a threshold and based on a vehicle-specific parameter, the prompt at least partially being representative of the error identification, affirmative user input response to said prompt subsequently causing modification or deletion of the one or more map data corrections, wherein the vehicle-specific parameter is at least one of: vehicle type; vehicle size; and vehicle weight.

12. A navigation system according to claim 11, wherein the navigation system is a personal navigation device (PND).

* * * * *